March 20, 1945. H. PURAT 2,372,117
WELDING MACHINE
Filed Jan. 2, 1943 6 Sheets-Sheet 1

INVENTOR
Hugo Purat.
BY
Harness, Dickey & Pierce.
ATTORNEYS.

March 20, 1945. H. PURAT 2,372,117

WELDING MACHINE

Filed Jan. 2, 1943 6 Sheets-Sheet 2

INVENTOR
Hugo Purat.
BY
Harness, Dickey & Pierce
ATTORNEYS.

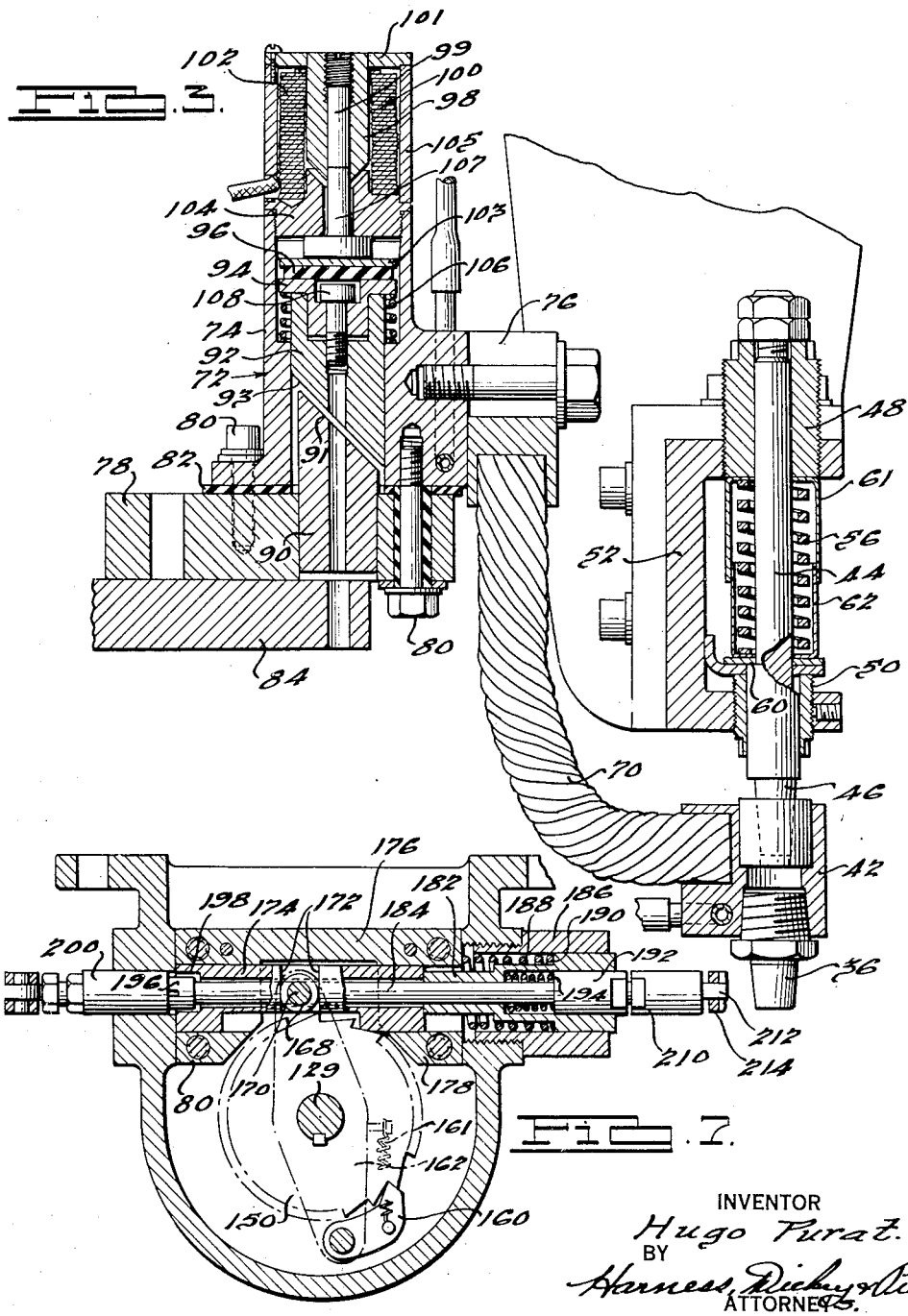

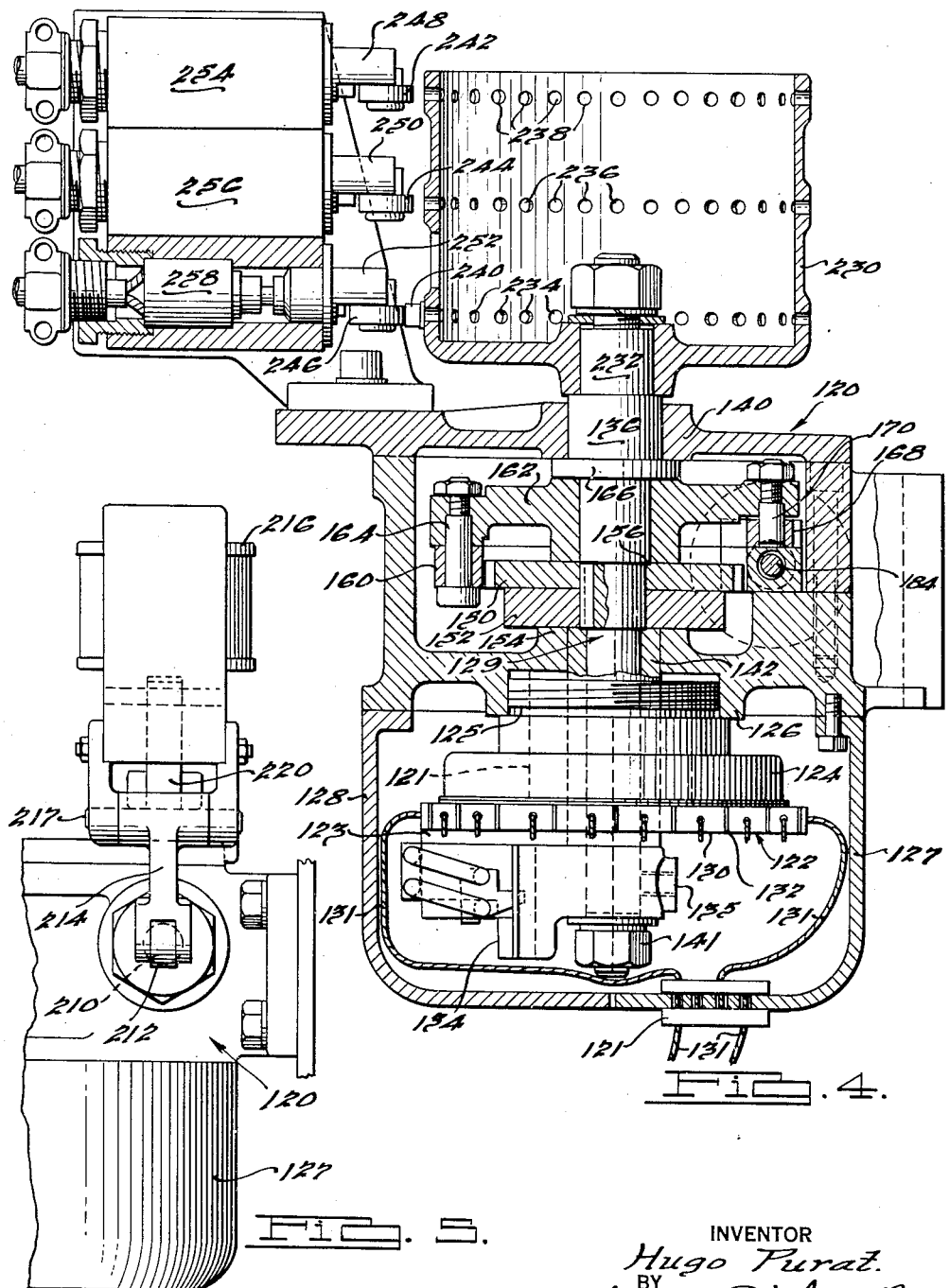

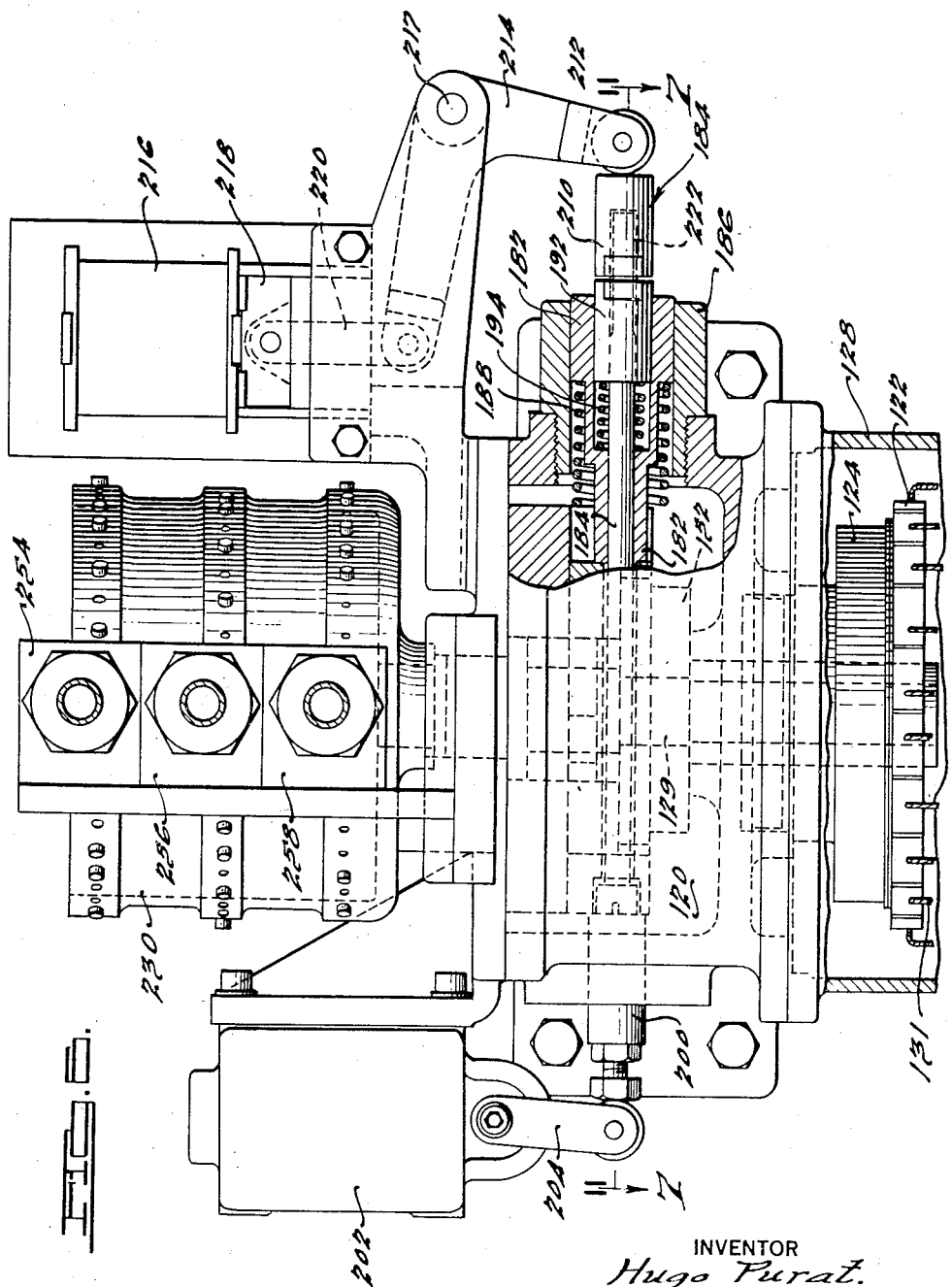

March 20, 1945.  H. PURAT  2,372,117
WELDING MACHINE
Filed Jan. 2, 1943    6 Sheets-Sheet 6
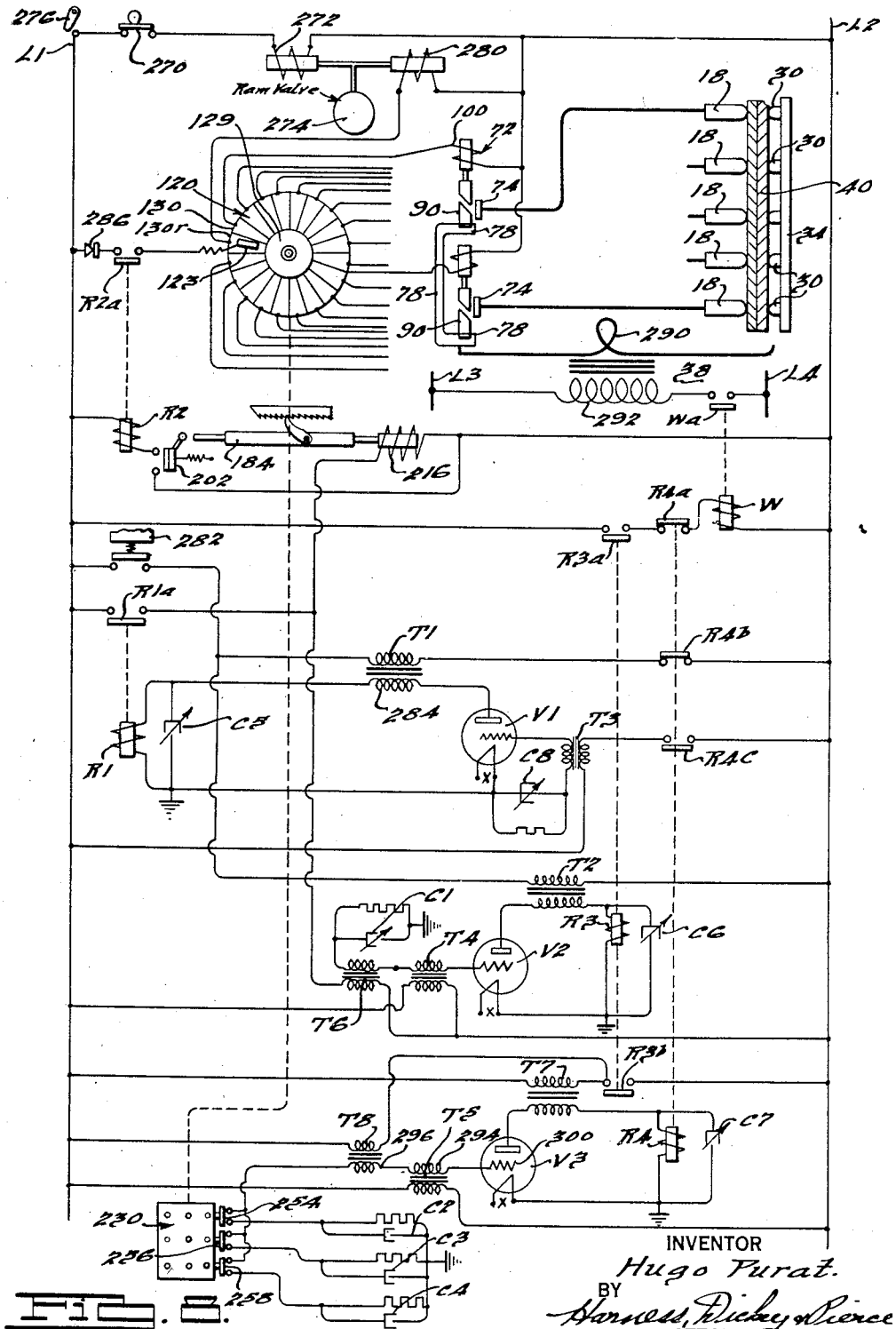
INVENTOR
Hugo Purat.
BY
Harness, Dickey & Pierce
ATTORNEYS.

Patented Mar. 20, 1945

2,372,117

UNITED STATES PATENT OFFICE 2,372,117

WELDING MACHINE

Hugo Purat, Detroit, Mich., assignor to Progressive Welder Company, Detroit, Mich., a corporation of Michigan Application January 2, 1943, Serial No. 471,136

7 Claims. (Cl. 171—97)

The present invention relates to electric welding machines, and is particularly directed to the provision of a machine embodying improvements over the structures disclosed and claimed in Hatch Patent No. 1,754,948, granted April 15, 1930, Martin Patent No. 2,126,490, granted August 9, 1938, and in the copending application of the present applicant, Serial No. 322,567, filed March 6, 1940, now Patent No. 2,287,945, granted June 30, 1942.

The present application is a continuation of applicant's copending but now abandoned application Serial No. 349,653, filed August 2, 1940.

The principal objects of the present invention are to provide a machine comprising a plurality of pairs of electrodes, and further comprising electromagnetically actuated indexing mechanism to connect the pairs of electrodes to a source of power in predetermined sequence; to provide such a system further characterized as embodying means operable after each electrode pair has been connected to the secondary winding of a supply transformer, to connect the primary winding of the transformer to a source of power; to provide such a system wherein the operation of the indexing unit is controlled by timing means which are selectively adjustable to time the flow of welding current and to afford a predetermined timing interval between each such indexing movement; to provide such a system wherein the timing means, in addition to operating the indexing unit, also actuates the means for connecting the primary of the welding transformer to the external circuit; to provide, for use in the above as well as other machines, an improved electromagnetically operated indexing unit; and to provide an improved control system for effecting the sequential operations of the machine.

With the above as well as other objects in view, a preferred but illustrative embodiment of the invention is shown in the accompanying drawings, throughout the several views of which corresponding reference characters are used to designate corresponding parts and in which:

Fig. 3 is a view in vertical section, taken along the line 3—3 of Fig. 1;

Fig. 4 is a view in vertical section, taken along the line 4—4 of Fig. 1;

Fig. 5 is a fragmentary view, taken along the line 5—5 of Fig. 1;

Fig. 6 is a view in elevation, taken along the line 6—6 of Fig. 2;

Fig. 7 is a view in horizontal section, taken along the line 7—7 of Fig. 6; and, Fig. 8 is a diagrammatic view of a control system, which may be, and preferably is, used in the practice of the invention.

It will be appreciated from a complete understanding of the present invention that the improvements thereof may be embodied in various forms and may be utilized for various specific purposes. By way of illustration, but not of limitation, the invention is herein disclosed in connection with a machine of the same general type as is disclosed in said copending application.

Figure 1:
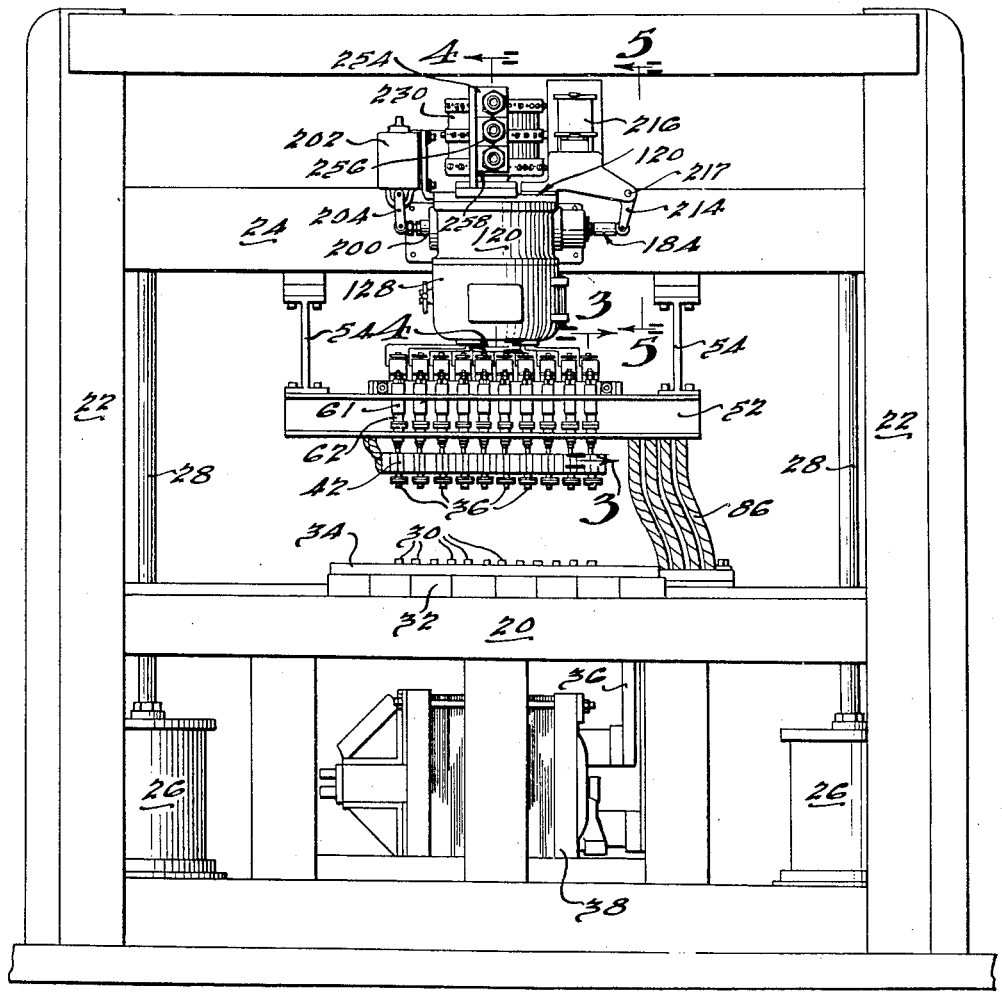
Figure 1 is a view in front elevation of a machine embodying the invention.
Figure 2:
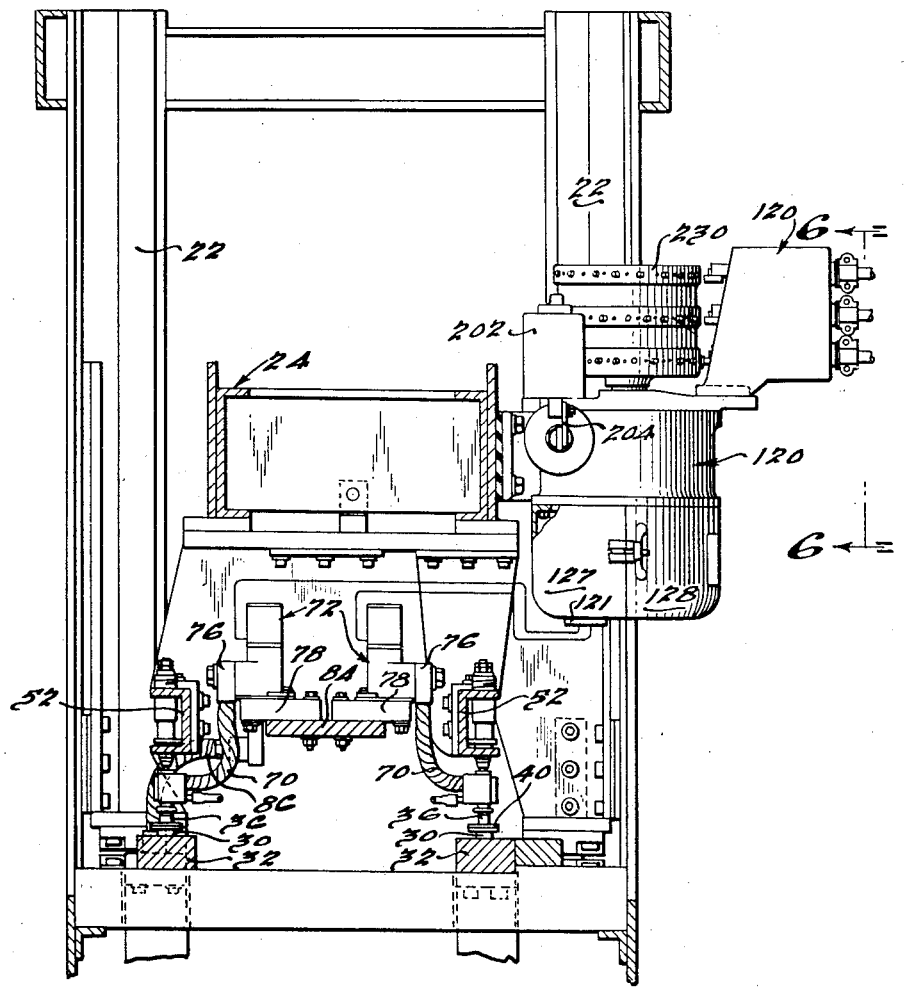
Fig. 2 is a view in side elevation, corresponding generally to Fig. 1, but showing the movable electrodes in their lower or operative positions.

Referring particularly to Figs. 1 and 2, the present machine comprises generally a supporting frame arranged to provide a horizontal work-supporting table 20, and having uprights 22, which afford ways (not shown) to accommodate vertical reciprocating movements of a movable electrode carriage 24. The movement of the carriage 24 between the elevated position shown in Fig. 1, and the lower or welding position shown in Fig. 2, is controlled by suitable means, illustrated as comprising a pair of rams 26, the cylinders whereof are stationarily supported upon the main machine frame, and the piston rods 28 whereof are connected to the movable carriage 24. The table 20 supports a plurality of stationary electrodes 30, which are insulated from the frame of the machine by an insulating support member 32, but which are electrically connected to a bus bar 34. The bus bar 34, in turn, is permanently electrically connected, as by the lead 36, to one terminal of the secondary winding of a transformer 38, which is mounted in the base of the machine.

The movable carriage 24 carries a plurality of resiliently mounted movable electrodes 36, one whereof is individual to each of the above-mentioned stationary electrodes 30. It will be appreciated that when the carriage 24 is elevated, the movable electrodes 36 are positioned in spaced relation to the cooperating stationary electrodes 30, and that when the carriage 24 is moved downwardly to welding position (Fig. 2), the work (indicated at 40 in Fig. 2) is clamped between the several pairs of stationary and movable electrodes 30 and 36. As is set forth in said copending application, the moving and stationary electrodes may be variously arranged at various elevations relative to each other and in various configurations and angular relations to the supporting table 20, depending upon the character of the work to be welded. For purposes of illustration in the present instance, the moving electrodes are illustrated as being vertically disposed, and as being arranged in two series, one series being arranged adjacent the front of the machine and a similar series being arranged adjacent the rear of the machine.

In further accordance with the arrangement disclosed in the above-identified copending application, the movable electrodes 36 are resiliently supported, so as to enable them to yieldingly engage the work to be welded. Referring particularly to Fig. 3, each movable electrode 36 is secured in a block 42, which block is attached to, but insulated from, a rod 44, by means of a sleeve 46. Each rod 44 is slidably supported, for limited vertical movement, in a pair of threaded sleeves 48 and 50, which sleeves are mounted in the flanges of a channel-shaped bar 52. The respectively opposite ends of the bar 52 are fixedly mounted upon the frame 24 by means of hangers 54. Each rod 44, and consequently each associated electrode 36, is continuously urged downwardly relative to the bar 52 by means of a compression spring 56, one end whereof bears against the sleeve 48, and the other end whereof bears against a washer, which seats against a shoulder 60 formed on the rod. Each spring 56 is enclosed within a pair of telescoping shells 61 and 62. It will be observed that the sleeve 50, against which the washer 58 bears, determines the limit of downward movement imparted to the rod 44 by the spring 56, whereas the sleeve 48 affords an adjustment of the spring 56, so as to vary its tension and consequently vary the pressure exerted between the stationary electrode 30 and a cooperating movable electrode 36.

In further accordance with the disclosure of the above-identified copending application, each electrode supporting block 42 is permanently electrically connected, by means of a flexible lead, such as the lead 70 of Fig. 3, to a corresponding electrode switch 72, one whereof is individual to each movable electrode. Each electrode switch 72 comprises a cylindrical body 74, formed of conducting material, and permanently connected to the associated lead 70 by means of a connecting block 76. Also, each switch body is permanently connected to, but insulated from, a bus bar 78, by means of studs 80 and insulating gaskets 82. The two bus bars 78, one being provided for each series of electrodes 36, in turn, are carried by a support 84, fixedly supported at its ends in the movable frame 24. The bus bars 78 are also permanently electrically connected to the other terminal of the transformer secondary, as by a plurality of flexible leads 86, which flexible leads accommodate the vertical movements of the carriage 24.

Each switch comprises a stationary contact member 90 having an angled upper surface 91 for co-operation with the correspondingly angled lower surface 93 of a co-operating contact member 92. The contact member 90 is wedged in a tapered bore formed in the bus bar 78 and thus is stationary. The contact member 92 is vertically slidable within the bore formed in the switch body 74 and is normally retained in the illustrated upper position in which the angled surfaces are separated, by means of a compression spring 106. The compression spring 106 is seated in a counterbore formed in the switch body and the upper end thereof bears against the under side of a collar 94. The collar 94 is connected to the contact 92 by means of a headed stud 108.

The solenoid structure for closing each switch 72 comprises a coil 100, which is supported upon a core piece 104. The coil 100 is enclosed by means of a shell 102 and a cover plate 101, which elements, it will be appreciated, are formed of magnetic material and thus constitute a part of the magnetic circuit of the solenoid. The armature structure for the solenoid comprises the cylindrical member 98, which receives a threaded adjusting screw 99, the lower end of which adjusting screw bears against the headed member 107. The member 107 is loosely received in the bore of the core piece 104, and downward force applied to the member 107 is transmitted to the collar 94 through a washer 103 and a compressible cushion 96. The upper end of the member 107 is received in the bore provided in the armature member 98, and thus serves to guide said armature member. It will be appreciated that by threading the stud 99 into or out of the member 98, the initial air gap between the conical lower end of the member 98 and the complementarily formed upper end of the core piece 104 can be varied.

It will further be appreciated that when the coil 100 is energized, the armature member 98 is drawn downwardly, and by means of the stud 99, this movement is transmitted to the member 107, which thereupon forces the contact 92 downwardly into wedging engagement with the contact 90. This wedging movement causes the surfaces 91 and 93 to wipe across each other and in accordance with the disclosure of said Patent No. 2,126,490, this action wedges the contact 92 into lateral engagement with the bore of the switch body 74. An efficient electrical connection is thus made, through the contacts 90 and 92, between the bus bar 78 and the associated movable electrode 36.

It is desirable to enable the armature member 98 to move downwardly far enough to engage the core piece 104, thus closing the previously mentioned air gap, and it will be appreciated that the compressible member 96 is proportioned to accommodate such final movement of the armature member 98.

The sequential opening and closing of the electrode switches, the opening and closing of the primary circuit of the supply transformer, and the duration of each welding impulse, which results from the closure of the primary circuit, are controlled by the indexing and control unit, which is designated as a whole in the various figures as 120.

Referring particularly to Figs. 4, 6 and 7, the indexing and control unit 120 comprises a commutator 122 which is stationarily supported by the frame 126 of the unit and is enclosed by a split cover having a rear half 127 and a front half 128. The rear half 127 is rigidly secured to the frame 126, and the front half 128 is hinged to the rear half, as most clearly appears in Figs. 1 and 2. The commutator 122 comprises a series of circumferentially arranged conducting segments 130, which are insulated from each other by usual segments 132 of insulating material, and which are supported upon a backing member 124. The backing member 124 has an integral adapter portion 125 which is threaded into a counterbore in the housing member 126.

The segments 130 are successively engaged, one at a time, by a moving brush 123, which is supported to engage the lower face of the commutator. The brush 123 is carried by a usual brush rigging 134, which is removably and adjustably secured to the lower end of the shaft 129 of the indexing unit. The shaft 129 passes through an enlarged bore 121 formed in the commutator, and is rotatably supported within the housing 126 in the hereinafter described manner.

The means for rotatably advancing the shaft 129 comprises a ratchet wheel 150, which is keyed to the shaft 129 within the housing 126 and which directly overlies a drag plate 152, which drag plate is also keyed to the shaft 129. The drag plate rests upon a boss 154 formed within the housing 126, and thus affords a thrust bearing element for the shaft assembly.

It will be noticed that the ratchet wheel 150 and drag plate 152 are fixed in place axially of the shaft 129 by means of the shoulder 156 formed on the shaft and by means of a sleeve 142 which is fitted over the shaft 129. The shaft 129, ratchet wheel 150, drag plate 152, sleeve 142 and brush rigging 134 are maintained in assembled relation to each other by a holding nut 141, which is threaded onto the lower end of the shaft 129. The nut 141 draws the rigging into solid engagement with the lower end of sleeve 142 and wedges the ratchet wheel 150 and drag plate 152 between the upper end of the sleeve 142 and the shoulder 156, as aforementioned. If desired, a locking set screw 135 may be threaded into the opening provided therefor in the brush rigging so as to more firmly secure the latter in adjusted position relative to the shaft 129.

The sleeve 142 is rotatably received in the previously mentioned bearing boss 154 and thus gives radial bearing support to the entire shaft assembly. A second radial bearing surface 136 on the shaft 129 is received in a boss 140 provided in the removable cover for the housing 126.

The ratchet wheel 150 is directly actuated by a pawl 160 of usual form, which is carried at the end of a lever 162. More specifically, the pawl 160 is pivotally supported upon a pin 164, which pin is secured to the arm 162, and it will be understood that the pawl 160 is provided with a spring 161 to yieldingly bias it in a counterclockwise direction, as viewed in Fig. 7. The lever is pivotally supported by the shaft 129, and is received between a shoulder 166 formed on the shaft and the ratchet wheel 150.

The lever 162 is rocked to thereby advance the shaft 129 in step-by-step manner by means of an assembly, comprising the slide 174, a collar 182 and a push rod 184, which are operatively connected to an actuating solenoid 216. The slide 174, which is of generally U-shaped form, as viewed in Fig. 7, is guided in ways 176, 178 and 180 secured in the housing 126, and is reciprocable between the lefthand limit position, shown in Figs. 6 and 7, and a normal position to the right thereof. The slide 174 is provided with a transverse notch 172 in its upper surface, which receives a roller provided at the end of the lever 162 remote from the pawl 160.

The collar 182 is slidably mounted in a boss 186, which is threaded into the body of the housing 126, and is provided with a biasing spring 188, which is seated between a shoulder 190 formed on the push rod and the way 176, which spring serves to continuously urge the collar 182 to the right, as viewed in Fig. 7. The collar 182 is further provided with a counterbore which receives the enlarged head 192 of the rod 184, and which also receives a biasing spring 194, which acts to continuously urge the rod 184 to the right relative to the collar 182.

The rod 184 passes through the collar 182 and also passes loosely through a bore formed in the slide 174, and at its lefthand end is provided with a head 196, which is received in a counterbore 198 formed in the slide 174. The head 196 affords a means for moving the slide 174 to the right, and also affords a means for operating the tappet 200 associated with a control switch 202. The switch 202 may be and preferably is of usual form, having a pair of contacts arranged to occupy the open position at all times except when the operating arm 204 thereof occupies the lefthand limit position, shown in Fig. 6. As clearly appears from Figs. 6 and 7, when the push rod 184 travels to the left, the head 196 thereof bears against the tappet 200, which is adjustable in length, and forces the operating arm 204 to rotate in a clockwise direction. The arm 204 is preferably provided with means to move the same in a counterclockwise direction as soon as the biasing force of the tappet 200 is relieved.

The rod 184 is provided at its righthand end with a tappet 210, which is adapted to be engaged by a roller 212 provided on an operating arm 214 of bell crank form, associated with the solenoid 216. The bell crank 214 is pivotally supported upon a pin 217, and is connected to the armature 218 of the solenoid by means of a usual link 220. With this relation, it will be understood that an upward movement of the armature 218, resulting from an energization of the solenoid 216, swings the bell crank 214 in a clockwise direction and forces the rod 184 to the left, bringing it to the position shown in Figs. 6 and 7.

The force applied to the rod 184 is transmitted to the collar 182 through the spring 194, which is heavier than spring 188. As a consequence, the just-mentioned force causes the collar 182 to move toward the lefthand position shown in the various figures, compressing the spring 188 and forcing the slide 174 to move toward the lefthand position. The just-mentioned movement of the slide 174 is operative, by virtue of the roller 168, to rock the lever 162 in a counterclockwise direction. The latter movement enables the pawl 160 to impart a predetermined angular advance to the ratchet wheel 150, which action correspondingly advances the brush 123, moving the same from a position in engagement with one commutator segment 130 to a position into engagement with the next successive commutator segment. As the slide 174 reaches the lefthand limit position, the angled lower surface 221 thereof rides into the space between successive teeth of the ratchet wheel 150, locking said wheel against movement in either direction until such time as the slide 174 is moved to the right out of the locking position. When the slide 174 reaches its lefthand limit position, further movement thereof is prevented, correspondingly preventing further leftward movement of the collar 182. Continued leftward movement of the rod 184, therefore, compresses the spring 194. The parts are preferably so proportioned that the control switch 202 is not closed by the tappet 200 until after the slide 174 has reached its lefthand limit position and completed the notching advance of the ratchet wheel. The amount of such further movement of the rod 184, which is needed to close the switch 202, can, of course, be varied by adjusting the length of the tappet 200, and in this connection, it is noted that the tappet 210 is also of adjustable length, the preferred adjustment being one wherein the armature 218 of the solenoid 216 is enabled to have its full movement. The tappet 210 is adjusted, as will be appreciated, by rotating the same on the stud 222, which stud is threaded into the counterbored end of the enlarged head 192 of the rod 184.

When the solenoid 216 is de-energized, the spring 188 is enabled to return the collar 182 to its righthand limit position, carrying with it the rod 184. The latter movement enables the head 196 to bear against the lefthand end of the slide 174 and move the latter to its righthand limit, and also swings the bell crank 214, associated with the solenoid, to its inactive position. During the return movement of the slide 174, the pawl 160 rides over the teeth of the ratchet wheel 150 without causing any movement thereof, since the ratchet wheel is subject to the frictional drag action of the previously mentioned drag plate 152, and also since the commutator 122 is subject to the drag action of the brush 123. The initial rightward movement of the rod 184 also enables the usual spring means (not shown) associated with the arm 204 of the control switch 202 to open the contacts associated with the latter.

In order to enable the indexing and control unit 120 to variably control the duration of each welding impulse, this unit is provided, at the upper end of the shaft 129, with a control drum 230 of the type disclosed in the aforesaid copending application. The control drum 230 is secured to the reduced portion 232 of the shaft 129, for rotation thereby, and is provided with three series of circumferentially distributed openings 234, 236 and 238. The openings of each series are adapted to receive removable tappets, such as 240, which tappets are arranged to cooperate with rollers 242, 244 and 246, provided at the ends of push rods 248, 250 and 252, associated, respectively, with timing switches 254, 256 and 258. These control switches are provided with normally open contacts (not shown in Fig. 3, but shown diagrammatically in Fig. 8), which contacts are adapted to be closed so long as the corresponding push rod is depressed by a tappet 240.

The indexing and control unit may be located either upon or remotely from the machine, but is herein shown as being mounted upon, but insulated from, the movable frame 24. With this relation, the leads, such as 131, from the commutator to the various electrode switches, which may individually be led from the unit 120 through one or more usual multiple plug and jack type junction boxes 121, are not subject to flexure during operation of the machine. The leads from the timing switches 254, 256 and 258, and from the control switch 202, are not shown except in Fig. 8, but it will be appreciated that these leads may be arranged to accommodate the movement of the frame 24. It is noted that the brush 123 is in electrical connection with the housing 126 through the shaft 129, brush rigging 134 and related parts, so that the connection for said brush, also shown only in Fig. 8, may be made directly to said housing 126.

From the foregoing, it will be appreciated that each energization of the solenoid 216 causes the indexing unit to advance through an angle equal to the angular spacing between adjacent teeth of the ratchet wheel 150, thereby causing a corresponding angular advance of the brush 123 relative to the commutator and of the control drum 230 relative to the timing switches. Such energization also results in a closure of the control switch 202, and maintains this switch closed as long as the solenoid 216 is energized. Moreover, the closure of the switch 202 does not occur until after the angular advances of the commutator 122 and of the control drum 230 have been completed. Depending upon the number and disposition of the tappets, such as 240, each such advance of the drum 230 may be caused to effect a closure of one or more, or none, of the timing switches 254, 256 and 258. As is described with reference to Fig. 8, each such notching advance is preferably arranged to close one of the control switches 254, 256 and 258 and leave the other control switches open. Accordingly, the preferred arrangement is one wherein the tappets, such as 240, are distributed between the series of openings 234, 236 and 238 in staggered relation, only one tappet being presented to an associated switch push rod in each position of the drum. It will further be understood that while only three series of openings and consequently only three switches are illustrated, larger or smaller numbers may be employed, if desired.

It will be appreciated that in the broader aspects of the invention, any of a variety of numerical ratios may be employed between the number of teeth or positions of the ratchet wheel 150, and the number of segments on the commutator. It will also be appreciated that each individual segment on the commutator can be arranged to control one or a group of the previously described electrode switches 72. In the preferred and illustrated arrangement, however, each segment on the commutator is arranged to control one such electrode switch and the commutator is, therefore, provided with a segment individual to each such switch. In addition, in the present instance, the commutator is provided with an additional segment which effects the hereinafter resetting of the system. With the present arrangement, therefore, the number of commutator segments equals the number of teeth on the ratchet wheel 150 and each notching movement of the unit moves the brush 123 out of engagement with one segment and into engagement with the next successive segment. The number of openings in each of the series of openings provided in the control drum 230 correspondingly equals the number of teeth on the ratchet wheel. At each notching position of the notching unit, accordingly, one pair of electrodes is supplied with welding current for an interval determined by the mechanism controlled by the timing switches 254, 256 and 258, and during the course of a full revolution of the notching unit, all of the pairs of welding electrodes are given one such impulse of welding current.

It will be recognized that, in the broader aspects of the invention, any of a variety of timing control and welding control systems may be employed in conjunction with the above described welding machine. A preferred such control system is, however, illustrated in Fig. 8.

Referring particularly to Fig. 8, certain of the previously described mechanical elements of the present system are shown diagrammatically and in addition, certain control relays and devices not previously described are also shown. These additional elements may best be described in connection with a description of operation of the system as a whole, but it is here noted that they comprise generally a series of three electronic valves V1, V2 and V3, and related electromagnetically operated relays. The valves V1, V2 and V3 are of the three-element type, having a plate, a filament, and a control grid, characterized in that they remain conducting so long as a predetermined potential is applied between the plate and the filament and so long as the potential of the control grid is maintained at a predetermined value relative to the potential of the filament. The valves remain non-conductive so long, however, as a so-called blocking potential is applied to the grids thereof. The valve V1 functions primarily in the present system to advance the notching unit and complete a circuit through the secondary winding of the welding transformer for the successive pairs of electrodes; the valve V2 functions primarily to control initial closure of the primary circuit of the welding transformer and to delay such closure until after the secondary circuit has been completed; and the valve V3 functions primarily to terminate the welding period by interrupting the primary circuit of the welding transformer and also serves to de-energize the solenoid 216 of the notching unit, thereby conditioning the same for the next succeeding notching movement.

The control system of Fig. 8 is illustrated as being supplied with alternating current from illustrative line conductors L1 and L2, and the system may be conditioned for operation by closing the line switch 276. It will be understood that such closure may be arranged to supply heating current to the filaments of the individual valves V1, V2 and V3, through conventional circuits which have been omitted in order to simplify the drawings. In the present instance, closure of the line switch 276 also initially energizes a control transformer T4 associated with the grid of the valve V2, enabling such transformer to immediately apply a blocking potential to the grid of the valve V2 and render the latter non-conductive. Closure of the switch 276 also energizes control transformer T5, enabling the latter to apply a blocking potential to the grid of the valve V3 and render this valve non-conductive.

Assuming it is desired to effect a welding operation, and that the workpieces 40 have been positioned upon the stationary electrodes 30, the starting switch, herein illustrated as a manually operable push button 270, may be closed, which action completes a circuit from the line conductor L1 through the operating winding 272 associated with a valve 274 to the other line conductor L2. Upon being energized, the winding 272 actuates the valve 274, which, it will be understood, actuates the previously described fluid rams 26, to lower the movable frame member 24 and bring the movable electrodes 36 down into clamping engagement with the workpieces 40, the degree of such clamping action being determined, as will be understood, by adjustment of the electrode supports described with reference to Fig. 3. The valve 274 is preferably of the type which remains in the position to which it is moved upon energization of the winding 272 until such time as the reset winding 280 is energized. The starting button 270 is, therefore, required to be closed only normally and the electrodes remain in clamping engagement with the work until such time as the reset winding 280 is energized.

As soon as a desired clamping pressure between the movable and the stationary electrodes is attained, a usual pressure switch 282, actuated by the frame 24, assumes the closed position, which action completes a circuit to energize the primary windings of the control transformers T1 and T2. The latter action is without immediate effect, since as mentioned above, the valve V2 is blocked by the potential impressed on the grid thereof by transformer T4. The energization of transformer T1 results in the energization of the winding of control relay R1. The winding of relay R1 is connected in the closed plate circuit of valve V1, which, under present conditions, is in a conducting condition.

Upon being energized, relay R1 closes its normally open contacts R1a. The closure of contacts R1a completes a circuit through the coil of the previously mentioned solenoid 216, associated with the indexing and control unit 120. In accordance with the previous description, the energization of solenoid 216 causes the brush 123 to advance from a position in engagement with the reset segment, designated 130r, into engagement with the next succeeding segment 130. Such notching advance also moves the drum 230 to a position in which one of the timing switches 254, 256 and 258 is closed. After completion of the brush advance, and after the particular timing switch is closed, the push rod 184 is enabled to close the control switch 202. The latter action directly completes the circuit for the winding of a control relay R2. As soon as the latter circuit is completed, relay R2 closes its contacts R2a, which action energizes the brush 123, thereby completing a circuit through the brush 123, the then-engaged segment, and thence through the coil 100 of the electrode switch 72, corresponding to the engaged segment. Upon being energized, such coil 100 forces its associated contact 92 downwardly, completing a circuit between the associated bus bar 78 and housing 74. In accordance with the previous description, the bus bar 78 is continuously connected to one terminal of the secondary winding 290 of the welding transformer 38; the other terminal thereof is connected to the stationary electrodes 30. The housing of the energized electrode switch is, in turn, directly connected to the corresponding movable electrode 36. The just-mentioned initial notching movement of the control unit 120 therefore serves to complete a welding circuit, through the secondary of the welding transformer, for a corresponding pair of electrodes 36—30.

The previously described closure of the relay contact R1a also completed a circuit for the primary winding of control transformer T6, thereby energizing the secondary winding thereof and enabling the latter to oppose the potential impressed on the grid of valve V2 by transformer T4. At this time, accordingly, the energy stored within the condenser C1, associated with valve V2, discharges therefrom, and after a predetermined period determined by the characteristics of the grid circuit, the grid of valve V2 attains a potential at which it renders V2 conducting. At this time, control relay R3 is energized through valve V2, by means of energy supplied from transformer T2. It is noted that the time delay provided by the timing condenser C1 is sufficient to insure the closure of the transformer secondary circuit prior to the closure of relay R3.

Upon being energized, control relay R3 closes its contacts R3a and R3b. The former contacts complete a circuit for the coil of the welding switch W, which circuit also includes the normally closed contacts R4a of control relay R4. Upon completion of the just-mentioned circuit, the welding switch W closes its contacts Wa and connects the primary winding 292 of the welding transformer 38 directly across the supply conductors L3 and L4, resulting in a flow of welding current between the previously energized pair of welding electrodes 36—30.

The closure of contacts R3b completes obvious circuits for the primary windings of control transformers T7 and T8. The secondary windings 294 and 296 of transformers T5 and T8 are connected in series with the grid 300 of valve V3. This grid circuit also includes, in parallel, the previously mentioned timing switches 254, 256 and 258, one of which timing switches is now closed in accordance with the previous description. The several timing switches control, respectively, the timing condensers C2, C3 and C4. Upon energization of transformer T8, accordingly, which opposes transformer T5, the potential previously applied to grid 300 is dissipated at a rate determined by the characteristics of the timing circuit associated with the closed one of the timing switches 254, 256 and 258. At the end of an interval determined by the characteristics of the active timing circuit, the potential on grid 300 falls to a value at which valve V3 becomes conductive. At this time, the previously energized transformer T7 is enabled to energize control relay R4, which thereupon opens its contacts R4a and R4b, and closes its contacts R4c.

The opening of contacts R4a interrupts the circuit for the welding switch W, terminating the flow of welding current.

The opening of contacts R4b de-energizes transformer T1, thereby interrupting the supply of energizing current to the coil of relay R1, and, after a brief period determined by the condenser C5, relay R1 resumes the de-energized position, opening the contacts R1a.

The closure of contacts R4c energizes transformer T3, which thereupon applies a blocking potential to the grid of valve V1, for a purpose described below. The opening of contacts R1a de-energizes the solenoid 216 of the notching unit, and also de-energizes the control transformer T6, which thereupon restores the valve V2 to its original non-conducting condition, and interrupts the energizing circuit for relay R3. The de-energization of relay R3, which occurs after a brief period, determined by the characteristics of the associated condenser C6, causes the contacts R3a and R3b to open. The opening of contacts R3a is without immediate effect in view of the previous opening of contacts R4a. The opening of contacts R3b de-energizes transformers T7 and T8. The de-energization of these transformers interrupts the energizing circuit for the winding of relay R4 and also restores the valve V3 to its original non-conductive condition. After a brief interval, determined by the characteristics of the associated condenser C7, relay R4 resumes the de-energized position, again closing contacts R4a and R4b and opening contacts R4c. The closure of contacts R4a is without effect at this time, since contacts R3a are open. The closure of contacts R4b again energizes transformer T1 in preparation for the next welding interval. The opening of contacts R4c interrupts the energizing circuit for transformer T3, and, as is discussed below, at the expiration of a period which is determined by the characteristics of the timing circuit, including condenser C8, valve V1 again becomes conducting.

The de-energization of solenoid 216, which resulted from the opening of relay R1, enables the push rod 184 to move to the right, as previously described, during the initial stages of which movement control switch 262 resumes the open position de-energizing control relay R2. The latter action interrupts the circuit through the brush 123 of the notching unit, thereby de-energizing the previously energized electrode switch 72 and interrupting the secondary transformer circuit through the initially actuated pair of welding electrodes 18—30. The continued rightward movement of the push rod 184 also restores the notching pawl mechanism to the righthand limit position thereof, thereby conditioning the same for a succeeding notching operation.

From the foregoing, it will be observed that the closure of the starting button 270 initially brings all of the movable electrodes down into clamping engagement with the work and thereafter causes the notching unit to advance to the first operating position. Upon reaching the first operating position, the notching unit first completes the secondary transformer circuit for the corresponding first pair of electrodes and thereafter causes completion of the primary circuit of the welding transformer, initiating the first welding interval. The timing system interrupts the primary circuit of the transformer at the conclusion of the just-mentioned first interval and thereafter causes the notching unit to interrupt the originally completed secondary circuit and assume a condition in readiness for the next notching operation.

So long as a blocking potential is maintained on the grid of valve V1 by means of the timing circuit, including condenser C8, the system remains in the same condition as obtained prior to the initial closure of the pressure switch 282. That is to say, relays R1, R2, R3 and R4 occupy the de-energized positions and blocking potentials are applied to the grids of valves V2 and V3 through transformers T4 and T5. The timing interval provided by the timing circuit, including condenser C8, determines the time interval between successive welding intervals. This time interval is preferably set to slightly exceed the time required for the notching unit to reset itself after the initial de-energization of the solenoid 216.

At the expiration of the time interval afforded by the timing circuit, including condenser C8, valve V1 again becomes conducting and, since transformer T1 is still energized through the pressure switch 282, transformer T1 is enabled to re-energize control relay R1. It is believed to be evident that the re-energization of control relay R1 again energizes the solenoid 216 of the notching unit, causing the brush 123 to advance to the next succeeding segment, and also energizes transformer T6, so as to condition relay R3 for operation. Also, the operation of the notching unit advances the timing drum 230 one notch, in which second position it again closes one of the timing switches 254, 256 and 258. The operation of the notching solenoid also closes the control relay R2, thereby completing a circuit for the solenoid of the electrode switch, corresponding to the now engaged commutator segment. The timing period provided by valve V2 again allows time to complete the just-mentioned secondary circuit and thereupon re-completes the primary circuit. The remaining operations also correspond to those described above, the length of the welding interval in this case being determined by that one of the timing switches 254, 256 and 258, which occupies the closed position.

So long, accordingly, as the pressure switch 282 remains closed, the respective pairs of electrodes are successively supplied with welding current for periods determined by the timing drum, each secondary circuit being completed prior to completion of the primary circuit and being opened only after interruption of the primary circuit. Only two of the electrode switches are shown diagrammatically in Fig. 8, but it will be appreciated that the remaining indicated circuits connected to the respective commutator segments lead to the other electrode switches in the same manner as is indicated for the illustrated two electrode switches.

It will be appreciated that it is usually desirable in welding systems to maintain the electrodes in clamping engagement with the work for an interval following the termination of the flow of welding current. In the present system, all of the electrodes remain in clamping engagement with the work until after the entire cycle is completed, so that special provision for the just-mentioned "hold time" need be made only in connection with the last pair of electrodes. In the present instance, this "hold time" is afforded by the timing condenser C5, associated with the relay R1, the discharge current whereof maintains the relay R1 energized for a short interval following the de-energization of the welding switch W. At the conclusion of the welding interval for the last pair of welding electrodes, and after the just-mentioned "hold time" provided by condenser C5, relay R1 again resumes the open position, and as before, de-energizes the notching solenoid 216, carrying the notching unit for movement to the original position in which the brush 123 engages the reset segment 130r. Also at the expiration of the timing interval provided by condenser C8, valve V1 again becomes conductive and re-energizes relay R1. The re-energization of relay R1 again energizes the notching solenoid 216, which thereupon advances the notching unit to the just-mentioned reset position and closes the control switch 202, energizing relay R2. As a consequence of these actions, a circuit is completed through the brush 123 and the reset segment 130r for the reset coil 280 of the valve 274, which thereupon applies power to the rams 26 in such relation as to cause them to elevate the movable electrode frame 24 to the position shown in Fig. 1. The initial lifting movement of the movable electrode frame 24 relieves the pressure on the pressure switch 282, allowing the same to open, interrupting the circuits for transformers T1 and T2. The latter action is without effect, since valve V2 is already in a non-conductive condition, but the de-energization of transformer T1 again de-energizes relay R1. This action de-energizes the notching solenoid 216, allowing the ratchet mechanism to resume its normal position and also opens switch 202, de-energizing relay R2. The latter action interrupts the circuit for the valve winding 280, which action is, however, without effect since the valve is now in the position corresponding to the elevated position of the movable electrode frame.

The reclosure of relay R1, which, as above stated, restored the notching unit to its original position, also re-energized transformer T6, tending to re-energize relay R3 and recomplete the welding circuit. As described above, however, the energization of relay R3 is delayed, following the closure of relay R1, for an interval determined by the timing condenser C1. This timing interval is adjusted, not only to allow sufficient time to close the welding transformer secondary circuit before the primary welding circuit is closed, but also to allow, under the conditions stated, for the opening of pressure switch 282 before relay R3 recloses. As soon as the pressure switch 282 is open, and de-energizes transformer T2, the energization of relay R3 is, of course, prevented.

At the conclusion of the above described complete cycle, the elements of the control system occupy the same positions as they occupied immediately prior to the initial closure of the starting button 270, and further complete cycles may, of course, be initiated by reclosing the button 270.

The switch structures principally illustrated in Fig. 3 are claimed in applicant's Patent No. 2,353,847, issued July 18, 1944, on application Serial No. 462,452, filed October 15, 1942. The indexing mechanism shown in detail in Figs. 4 through 7 is claimed in applicant's co-pending application Serial No. 554,596, filed September 18, 1944, as a continuation of application Serial No. 462,451, filed October 15, 1942, said applications Serial Numbers 462,451 and 462,452 being divisions of applicant's parent application Serial No. 349,653, filed August 2, 1940. The present application is a continuation of said parent application Serial No. 349,653.

Although only a single complete embodiment of the invention has been described in detail, it will be appreciated that various modifications in the form, number and arrangement of parts may be made within the spirit and scope thereof.

What is claimed is:

1. In an electrical control system for controlling the flow of current from a source of load current through a plurality of electric energy consuming devices, the combination of means including circuit connections and a plurality of electroresponsive switches for connecting said devices to said source, said switches being actuable between circuit interrupting and circuit closing conditions, one said switch and the corresponding circuit connections being individual to each said device and each said switch having energizable means effective upon being energized to actuate the corresponding switch from one said condition to the other, circuit commutating means, and means rendered effective by said circuit commutating means for controlling the supply of energizing current to the said energizable means to thereby cause the same to successively interrupt and close the circuit connections to the corresponding devices.

2. In an electrical control system for controlling the flow of current from a source of load current through a plurality of electric energy consuming devices, the combination of means including circuit connections and a plurality of electroresponsive switches for connecting said devices to said source, said switches being actuable between circuit interrupting and circuit closing conditions, one said switch and the corresponding circuit connections being individual to each said device and each said switch having energizable means effective upon being energized to actuate the corresponding switch from one said condition to the other, circuit commutating means, means rendered effective by said circuit commutating means for controlling the supply of energizing current to the said energizable means to thereby cause the same to successively close the circuit connections to the corresponding devices, and timing means for controlling the supply of energizing current to said energizable means to thereby determine the period during which each switch is effective to close the circuit connections to the corresponding devices and for causing each such switch to interrupt the corresponding circuit connections.

3. In an electrical control system for controlling the flow of current from a source of load current through a plurality of electric energy consuming devices, the combination of means including circuit connections and a plurality of electroresponsive switches for connecting said devices to said source, said switches being actuable between circuit interrupting and circuit closing conditions, one said switch and the corresponding circuit connections being individual to each said device and each said switch having energizable means effective upon being energized to actuate the corresponding switch from one said condition to the other, circuit commutating means, means rendered effective by said circuit commutating means for controlling the supply of energizing current to the said energizable means to thereby cause the same to successively close the circuit connections to the corresponding devices, timing means for controlling the supply of energizing current to said energizable means to thereby determine the period during which each switch is effective to close the circuit connections to the corresponding device and for causing each such switch to interrupt the corresponding circuit connections, and means rendering said timing means effective to control said circuit commutating means.

4. The combination defined by claim 1 including switch means common to said devices and operable in timed relation to said electroresponsive switches.

5. The combination defined by claim 1 including control means to enable certain of said switches to cause delivery of current to the corresponding devices for periods which differ from the periods afforded by others of said switches.

6. The combination defined by claim 1 wherein said switches are normally open and, when supplied with energizing current, move to a closed position in which they directly complete the circuit connections to the corresponding devices.

7. The combination defined by claim 1 wherein the circuit commutating means includes an electromagnetically actuated indexing device operable in step-by-step fashion.

HUGO PURAT.